US012811405B2

(12) United States Patent
Mazzetti, Jr. et al.

(10) Patent No.: US 12,811,405 B2
(45) Date of Patent: Nov. 24, 2026

(54) BATTERY ENERGY STORAGE SUPPLEMENTAL POWER WITH A LINE REACTOR

(71) Applicant: Rosendin Electric, Inc., San Jose, CA (US)

(72) Inventors: William Paul Mazzetti, Jr., San Francisco, CA (US); Steve Emert, Menlo Park, CA (US)

(73) Assignee: Rosendin Electric, Inc., San Jose, CA (US)

( * ) Notice: Subject to any disclaimer, the term of this patent is extended or adjusted under 35 U.S.C. 154(b) by 0 days.

(21) Appl. No.: 18/892,026

(22) Filed: Sep. 20, 2024

(65) Prior Publication Data

US 2025/0015598 A1 Jan. 9, 2025

Related U.S. Application Data

(63) Continuation-in-part of application No. 18/375,875, filed on Oct. 2, 2023.

(60) Provisional application No. 63/539,986, filed on Sep. 22, 2023, provisional application No. 63/413,567, filed on Oct. 5, 2022.

(51) Int. Cl.

| | |
|---|---|
| ***H02J 3/32*** | (2026.01) |
| ***H02J 3/001*** | (2026.01) |
| ***H02J 3/0014*** | (2026.01) |
| ***H02J 3/38*** | (2026.01) |
| ***H02J 9/06*** | (2006.01) |
| ***H02J 13/36*** | (2026.01) |
| *H02J 101/24* | (2026.01) |
| *H02J 101/30* | (2026.01) |
| *H02J 101/40* | (2026.01) |

(52) U.S. Cl.

CPC ............ *H02J 3/32* (2013.01); *H02J 3/00125* (2020.01); *H02J 3/00142* (2026.01); *H02J 3/381* (2013.01); *H02J 9/062* (2013.01); *H02J 13/36* (2026.01); *H02J 2101/24* (2026.01); *H02J 2101/30* (2026.01); *H02J 2101/40* (2026.01)

(58) Field of Classification Search

CPC ...... H02J 3/32; H02J 3/00125; H02J 3/00142; H02J 13/36; H02J 3/381; H02J 9/062; H02J 2101/24

USPC ............................................................ 307/43

See application file for complete search history.

(56) References Cited

U.S. PATENT DOCUMENTS

2022/0224144 A1* 7/2022 Emert .................... H02J 9/061

* cited by examiner

*Primary Examiner* — Michael R. Fin

(74) *Attorney, Agent, or Firm* — Rutan and Tucker, LLP

(57) ABSTRACT

A line reactor cooperates with a utility electrical power grid and other power sources. The line reactor electrically connects in series with a power supplied from the utility electrical power grid. The line reactor mitigates power changes. The line reactor cooperates with an electrical controller to change a state of circuit breakers and components in a micro grid to configure a mode of operation of these components to supply electrical power to downstream electrical loads. The line reactor temporarily maintains steady state voltage and amperage supplied electrical power to electrical loads connected downstream of the line reactor in order to safely change the state of the circuit breakers and other components to transition between power sources.

15 Claims, 9 Drawing Sheets

BATTERY ENERGY STORAGE SUPPLEMENTAL POWER WITH A LINE REACTOR

RELATED APPLICATIONS

This application claims priority under 35 USC 119 to U.S. provisional patent application Ser. No. 63/539,986, titled "BATTERY ENERGY STORAGE SUPPLEMENTAL POWER WITH A LINE REACTOR," filed Sep. 22, 2023. This application claims priority under 35 USC 120 to U.S. patent application Ser. No. 18/375,875, filed Oct. 2, 2023, titled BATTERY ENERGY STORAGE SUPPLEMENTAL POWER, which claims priority under 35 USC 119 to U.S. provisional patent application Ser. No. 63/413,567, titled "BATTERY ENERGY STORAGE SUPPLEMENTAL POWER," filed 5 Oct. 2022. All of these are incorporated herein by reference.

FIELD

Embodiments of the design relate to Electrical Power Distribution.

BACKGROUND

Diesel generators and other electrical generators can be used to provide power. A previous technology used a battery that did not cooperate with or have a line reactor in series with the power from the utility electrical power grid and therefore had to have a remote electrical tap and sensor to sense characteristics of power coming from a main power source so that an electrical controller could mitigate changes in the steady state electrical current by causing the battery to put out more or less energy prior to those changes from affecting downstream electrical loads.

SUMMARY

Methods systems, and apparatus are disclosed for a Battery Energy Storage Supplemental Power platform (BESSP).

In an embodiment, a line reactor cooperates with a utility electrical power grid and other power sources. The line reactor electrically connects in series with a power supplied from a utility electrical power grid. At least one of 1) one or more fuel cells and 2) a solar power storage device electrically connects to the line reactor and cooperates with the line reactor to mitigate power changes due to i) instantaneous startup electrical currents, ii) other in-rush electrical currents compared to a steady state electrical current, iii) a loss of power from the utility electrical power grid, and iv) any combination of these three. The line reactor is configured to cooperate with an electrical controller configured to change a state of a set of circuit breakers to configure a mode of operation of the line reactor, the fuel cells and/or solar power storage device, and the utility electrical power grid supplying electrical power to downstream electrical loads. The fuel cells and/or solar power storage device and the line reactor in series with the power from the utility electrical power grid cooperate to provide electrical power to the downstream electrical loads and mitigate the power changes due to i) the instantaneous startup electrical currents, ii) the other in-rush electrical currents compared to the steady state electrical current, iii) the loss of power from the utility electrical power grid from effecting the downstream electrical loads, and iv) any combination of these three, until the electrical controller can change the state of the set of circuit breakers in order to change from a first mode of operation via the line reactor, the fuel cells and/or solar power storage device, and the utility electrical power grid supplying electrical power cooperating together over to a second mode of operation. The line reactor is constructed to temporarily maintain steady state voltage and amperage; and thus, resist changes to the steady state voltage and amperage in supplied electrical power to electrical loads connected downstream of the line reactor when the i) instantaneous startup electrical currents, ii) other in-rush electrical currents compared to the steady state electrical current, iii) the loss of power from the utility electrical power grid, and iv) any combination of these three, occur from affecting the downstream electrical loads long enough in time in order to safely change the state of the set of circuit breakers to transition between power sources being responsible for supplying the electrical power to the downstream electrical loads when changing from the first mode of operation to the second mode of operation.

These and many more embodiments are discussed.

BRIEF DESCRIPTION OF DRAWINGS

The drawings refer to example embodiments of the invention included in this document and submitted with this document.

Figure 1:
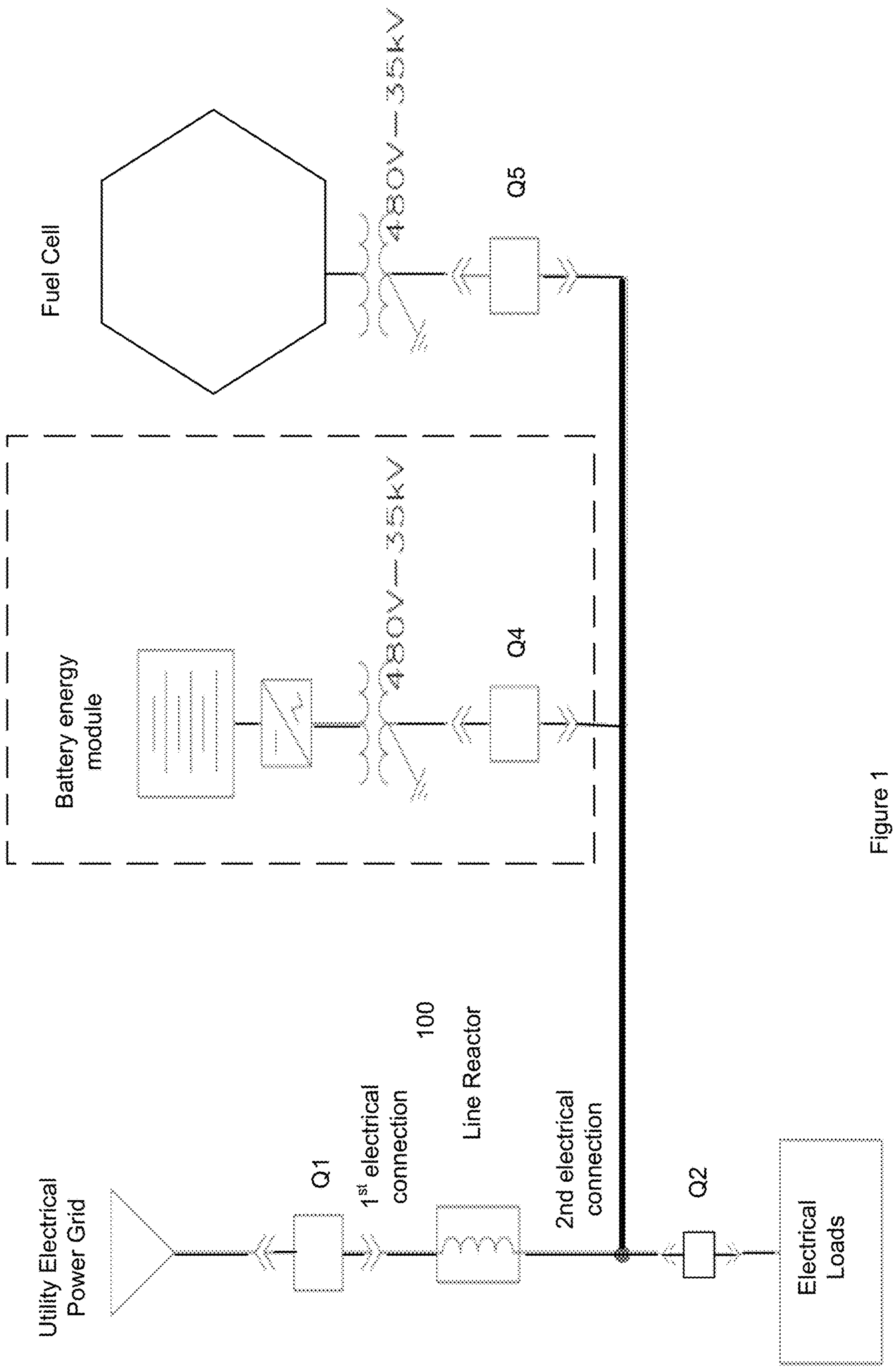
FIG. 1 illustrates an example embodiment of a line reactor that has a first electrical connection configured to electrically connect in series with an electrical power supplied from a utility electrical power grid through a circuit breaker.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, amount of emergency power supplies, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first mode, may be made. However, the specific numeric reference should not be interpreted as a literal sequential order but rather interpreted that the first mode is different than a second mode. Thus, the specific details set forth are merely exemplary. The specific details may be varied from and still be contemplated to be within the spirit and scope of the present invention.

FIG. 1 illustrates an example embodiment of a line reactor that has a first electrical connection configured to electrically connect in series with an electrical power supplied from a utility electrical power grid through a circuit breaker. The line reactor 100 electrically in series with the electrical power from the utility electrical power grid through circuit breaker Q1 is configured to mitigate power changes due to i) instantaneous startup electrical currents, ii) other in-rush electrical currents compared to a steady state electrical current, iii) a loss of power from the utility electrical power grid, and iv) any combination of these three. The line reactor 100 in series with the electrical power from the utility electrical power grid that has a second electrical connection cooperates with a micro grid of redundant electrical power sources so that the utility electrical power grid is not the sole source of electrical power to the downstream electrical loads. The electrical loads connect through circuit breaker Q2 downstream of the line reactor.

The micro grid of redundant electrical power sources can be connected electrically in parallel with the utility electrical power grid and the line reactor. The micro grid of redundant electrical power sources can include in this example 1) the battery energy storage supplemental power platform with its set of batteries making up a battery storage plant, a bidirectional power conversion unit, a step up voltage transformer, and its circuit breaker Q4 and 2) one or more of fuel cells with its step up voltage transformer and its circuit breaker Q5. The fuel cells and the battery energy storage supplemental power platform are sized in capacity to support the full electrical load as well as push power onto the utility electrical power grid. In this microgrid example, no diesel generators or low voltage uninterruptible power supplies are needed for the electrical load.

The line reactor 100 cooperates with an electrical controller configured to change the state (e.g., open and/or close) of the set of circuit breakers including at least Q1 to Q5 to configure a mode of operation from the line reactor, the redundant electrical power sources in the micro grid, and the utility electrical power grid supplying electrical power to downstream electrical loads. The electrical controller can also direct an operational state of the components in the micro grid.

The line reactor 100 is an inductor. The inductor can be a passive component constructed to store energy as a magnetic field around the insulated coil. The inductor can be used to filter, sense, or transform electrical current. The inductor has a physical size, including a diameter thickness of a wire gauge, and a composition of materials of the inductor to store at least enough energy to match the energy consumption requirements of the electrical loads for a time period in duration to sustain a switching from a first mode of operation to a second mode of operation. The line reactor 100 can have an iron core inductor that is sized large enough in electrical current rating to store at least enough energy to match an entire energy consumption requirement of the downstream electrical loads for the time period in duration to sustain the switching from the first mode of operation to the second mode of operation without dropping below a threshold amount from a steady state voltage and amperage supplied in the first mode of power supply.

The line reactor 100 is configured to cooperate with the electrical controller and the redundant electrical power sources in the micro grid and has the physical size as follows. A mode of operation can be i) a first portion of the electrical loads being supplied from the line reactor 100 and the utility electrical power grid and ii) a remaining portion of the electrical loads being supplied power from the redundant electrical power sources in the micro grid to the downstream electrical loads; and thus, the line reactor 100 needs to be sized accordingly. The line reactor 100 has a physical size with a diameter thickness of a wire gauge and a composition of materials of the inductor to store at least enough energy to match the energy consumption requirements of the electrical load for a time period in duration to sustain a switching from the first mode of operation to the second mode of operation.

The line reactor 100 can provide transitional power until a redundant electrical power source, such as a diesel generator or other redundant power source, can be started up and brought online to a steady state power supply condition. In an embodiment, the line reactor 100 is sized to support the power demand of the electrical loads for up to 10 to 15 seconds. In an embodiment, the line reactor 100 is sized to support the power demand of the electrical loads for up to 5 to 10 seconds. The line reactor 100 is constructed to temporarily maintain steady state voltage and amperage; and thus, resist changes to the steady state voltage and amperage in supplied electrical power to electrical loads connected downstream of the line reactor 100 when i) the instantaneous startup electrical currents, ii) the other in-rush electrical currents compared to the steady state electrical current, iii) the loss of power from the utility electrical power grid, and iv) any combination of these three, occur from affecting the downstream electrical loads long enough in time in order to safely change the state of (e.g. open up or close) the set of circuit breakers to transition between power sources being responsible for supplying the electrical power to the downstream electrical loads when changing from the first mode of operation to the second mode of operation.

The line reactor 100 can be a critical component in the line interactive uninterruptible power supply. The line reactor 100 isolates the critical electrical load from a wide variety of problems with the incoming power. The following analysis determines the capacity of the uninterruptible power supply: 1) line reactor's impedance and 2) total demand. The line reactor's impedance is complicated as it has two diametrically opposed requirements. 1) The line reactor 100 should have low impedance requirements when the line reactor 100 and the critical electrical load are in series during 'Normal Mode' operations. 2) The line reactor 100 should have high impedance requirements to store at least enough energy to match the energy consumption requirements of the electrical loads when the line reactor 100 and the critical electrical load are paralleled during unplanned transition events.

Overall, the line interactive uninterruptible power supply uses a line reactor 100 to isolate the critical electrical load from incoming power anomalies and outages including blackouts and brownouts. As discussed, the line reactor 100 may be an iron core inductor. The main criteria when specifying the size and energy storage capacity of an inductor are its voltage rating, current rating, and impedance.

The inductor's voltage rating is set at the installation's line voltage to match the voltage coming from the utility electrical power grid. The inductor's current rating is a function of the critical electrical load's demand. The inductor's impedance is determined by evaluating the inductor's energy consumption requirements of the electrical loads for a time period in duration to sustain a switching from a first mode of operation to a second mode of operation during both 1) an unplanned transition event and 2) normal mode operations.

'Unplanned' Transition Event: Unplanned transition events occur due to incoming power outages or line faults. During an unplanned transition event the uninterruptible power supply is the only reliable source of power as the utility electrical power grid may be going away due to a loss of power and the redundant electrical power sources in the micro grid may not be electrically connected and supplying electrical power at the voltage levels needed by the electrical loads. Low impedance power outages or line fault events can place excessive demands on the uninterruptible power supply. This is because the uninterruptible power coupled to the line reactor 100 must supply the effective load of the line reactor 100 that is now in parallel with the critical electrical load. (See FIG. 8) Unplanned transition event demands are determined by the equivalent impedance of the line reactor 100 in parallel with the critical electrical load. [Zcr & Zlr/(Zcr+Zlr)]. Parallel impedances are lower than when the components are connected in series. This condition is maintained until the circuit breaker Q1 opens effectively disconnecting the line reactor 100 from the utility electrical power grid. The uninterruptible power coupled to the line reactor 100 must supply and maintain voltage and current requirements until the redundant electrical power sources in the micro grid are now electrically connected and supply electrical power at the voltage levels needed by the electrical loads.

Again, an unplanned transition event can exceed the rated power from the Power Conversion System (PCS) and the Battery Energy Module (BEM). This is because with a low impedance utility outage or bus fault, the line reactor 100 is now an additional load until the Q1 circuit breaker is opened. This demand is determined by the equivalent impedance of the critical electrical load's impedance in parallel with the line reactor's impedance. During an unplanned transition event a line reactor 100 with a large impedance places less demand on the uninterruptible power supply than a line reactor 100 with a low impedance.

The size of the choke/line reactor 100 is made large enough, e.g., matched in size, to store the energy consumption requirements of the critical electrical load for a time period in duration to sustain the switching to the micro grid completely powering the critical electrical loads and isolating from the utility power source. If the system is a one megawatt electrical load system, then the line reactor 100 is also sized as a one megawatt inductor.

The physical size of an inductor is related to the energy it can store. Different core materials can store different amounts of magnetic energy per volume, but within the same core material, inductor size is largely dictated by energy storage. With this inductor, the high levels of max. current requires a thick gauge wire diameter and/or different core material (because of saturation). The energy an inductor can store, in common units, is: J=½ A2H where J is the energy in Joules, A the current through the inductor in Amps, and H is the inductance in Henrys.

Figure 2:
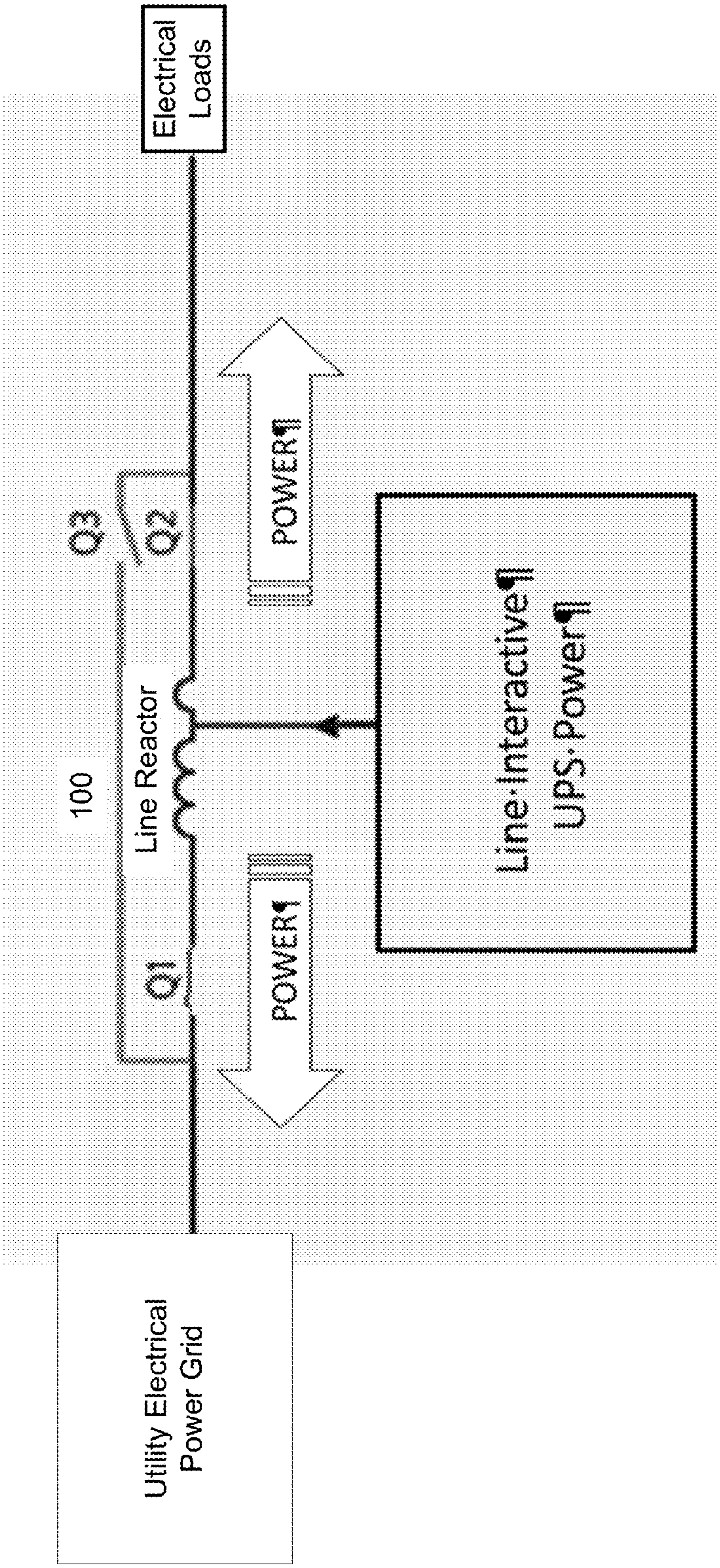
FIG. 2 illustrates an example embodiment of a line reactor couples to a line interactive uninterruptible power supply to supply conditioned continuous electrical power to the downstream electrical loads as well as depending on the mode of operation electrical power back to the utility electrical power grid.

FIG. 2 illustrates an example embodiment of a line reactor couples to a line interactive uninterruptible power supply to supply conditioned continuous electrical power to the downstream electrical loads as well as depending on the mode of operation electrical power back to the utility electrical power grid. The line reactor 100 electrically connects in series through circuit breaker Q1 with power supplied from a utility electrical power grid to the downstream electrical loads through circuit breaker Q2.

The line interactive uninterruptible power supply may be constructed similarly to the battery energy storage supplemental power platform or even be the battery energy storage supplemental power platform depending upon the capacity requirements. The line interactive uninterruptible power supply can have its electrical inverter and its magnetic choke/line reactor 100 constructed as bidirectional to allow AC power to flow in and charge the batteries and DC to AC power to flow out of the bidirectional inverter to power the downstream electrical loads.

The line interactive uninterruptible power supply with the magnetic choke/line reactor 100 does eliminate transient noise but also isolates the downstream critical electrical loads from the power changes (e.g. effects on voltage, frequency, and current) when the utility power goes away for a long enough period of time by itself supply/resisting the change in voltage, frequency, and current when the utility power goes away so that when the emergency power supply takes over sole powering of the downstream critical electrical loads do not experience any change (any temporary spikes) in the voltage, frequency, and current when the utility power goes away and the emergency source of power solely powers the downstream critical electrical loads.

The line interactive uninterruptible power supply with the magnetic choke does eliminate transient noise but also isolates the downstream critical electrical loads from the effects on voltage, frequency, and current when the utility power goes away for a long enough period of time by itself supply/resisting the change in voltage, frequency, and current when the utility power goes away so that when the emergency power supply kicks in the downstream critical electrical loads do not experience any change (any temporary spikes) in the voltage, frequency, and current when the utility power goes away and the emergency source of power takes over.

The line interactive uninterruptible power supply must have the capacity to supply enough power to drive both the reactive choke line reactor 100 and the critical electrical loads in order to support having a large choke that can resist changes in voltage and frequency long enough when utility power goes away.

The line interactive uninterruptible power supply with the line reactor 100 is both an uninterruptible power supply when the utility power is available AND an emergency power source with enough capacity to power the critical electrical loads for at least hours of operation itself when utility power is not available.

The following are typical incoming utility power quality problems that can be mitigated by the line reactor 100 cooperating with the battery energy storage supplemental power platform, the fuel cells, or the line interactive uninterruptible power supply: 1) Voltage sags [sub cycle], 2) Voltage sag/brownouts [multi cycle], 3) Voltage spikes, 4) Voltages swell, 5) Utility outages [Low Impedance], 6) Utility Outages [Hight Impedance], 7) Harmonic distortions, 8) Radio Frequency interferences [RFI/EMI], 9) Frequency variation, 10) Unbalanced voltages, 11) Loss of phase, and 12) Lightning strikes.

Figure 3:
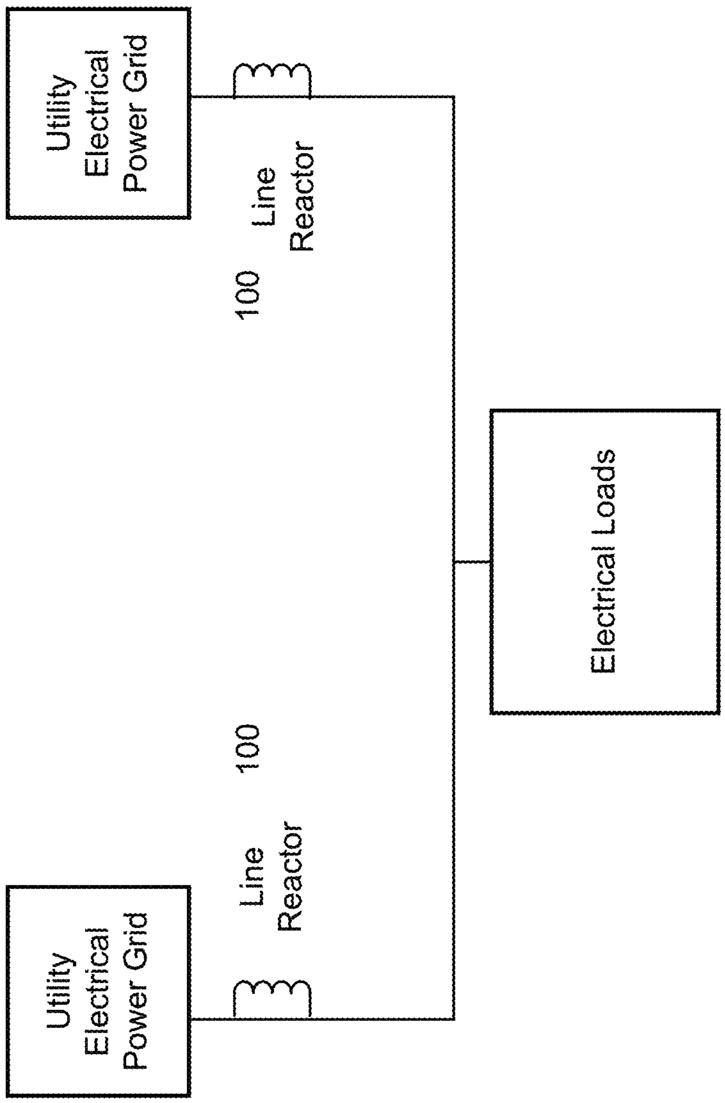
FIG. 3 illustrates an example embodiment of a line reactor implemented as multiple line reactors electrically in parallel with each other and in series with the utility electrical power grid.

FIG. 3 illustrates an example embodiment of a line reactor implemented as multiple line reactors electrically in parallel with each other and in series with the utility electrical power grid. The line reactor 100 can be implemented as a single line reactor 100 electrically in series with the utility electrical power grid (see FIG. 1) or multiple line reactors electrically in parallel with each other and in series with the utility electrical power grid.

When multiple inductors are connected in parallel, the following effects can occur: 1) The voltage across each inductor is the same. 2) The total electrical current is the sum of each inductor's current, but each inductor's current is a fraction of the total current. 3) The multiple inductors share the same magnetic field. 4) The total inductance fluctuates based on the magnetic coupling between the coils. 5) Voltage drop: For a given rate of change in current, there is less voltage drop across the parallel inductors than across any of the inductors individually. This is because the total current is divided among the parallel branches. When the line reactor 100 is implemented as multiple inductors, then the physical size, including the diameter thickness of the wire gauge, and the composition of materials of the inductor to store at least enough energy to match the energy consumption requirements of the electrical loads is spread across the multiple inductors.

Figure 5:
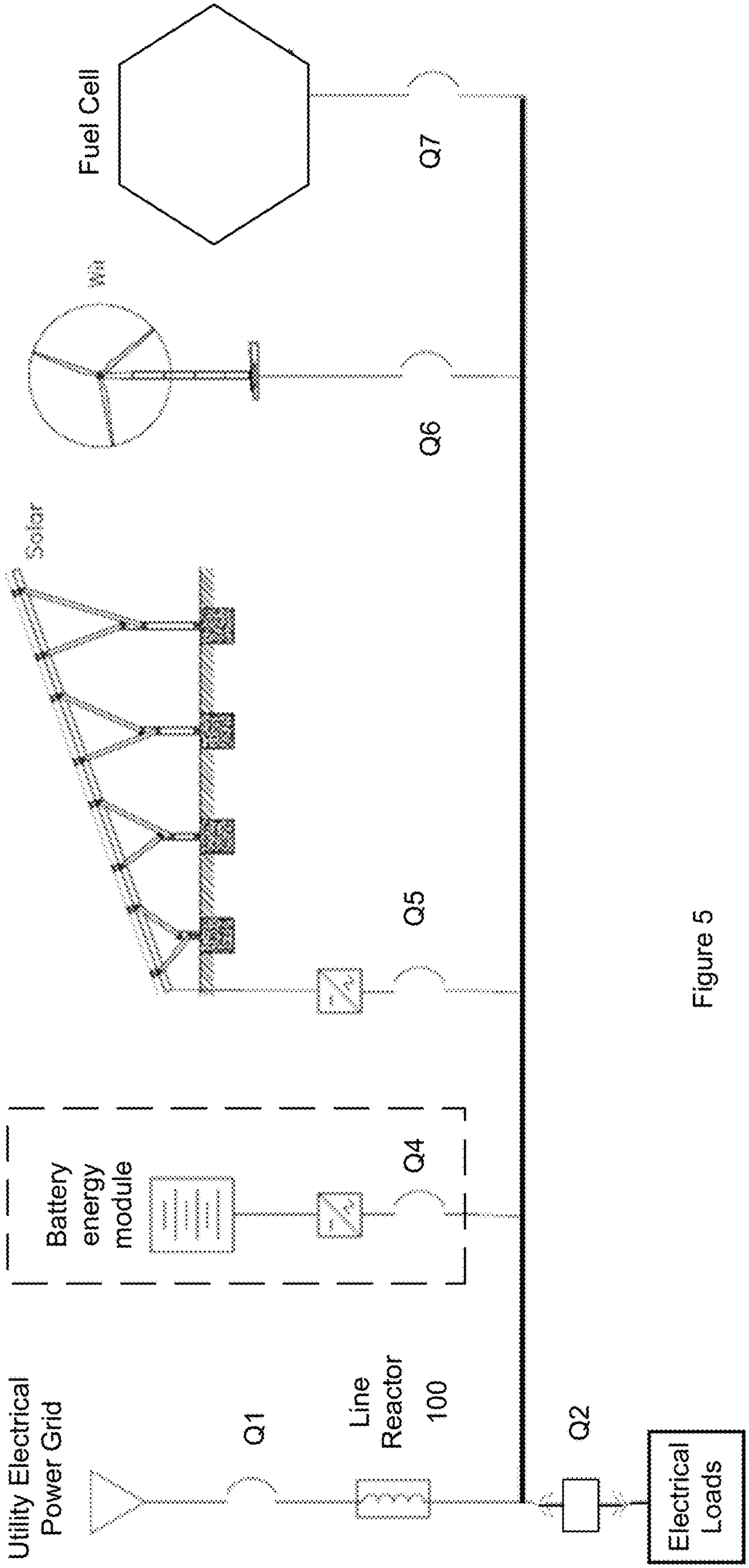
FIG. 5 illustrates an example embodiment of the utility electrical power grid connecting through a first circuit breaker to the line reactor and the redundant electrical power sources in the micro grid as well as the electrical loads that connect downstream to a bottom portion of the line reactor.

FIG. 5 illustrates an example embodiment of the utility electrical power grid connecting through a first circuit breaker to the line reactor and the redundant electrical power sources in the micro grid as well as the electrical loads that connect downstream to a bottom portion of the line reactor.

The micro grid can include a set of circuit breakers, a set of redundant electrical power sources, the line reactor, the electrical controller, and the electrical loads (including regular electrical loads and critical electrical loads). The power from the utility electrical power grid connects to the top portion of the line reactor, such as an inductive choke associated with the battery powered uninterruptable power supply. The other power sources in the micro grid and the regular and critical electrical loads connect to the bottom portion/downstream side of the line reactor 100 associated with the battery powered uninterruptable power supply. The redundant electrical power sources in the micro grid can include the battery energy storage supplemental power platform, one or more fuel cells, a solar power storage device, a wind power generator, and a diesel generator.

The micro grid has redundant power sources to supply power to the electrical loads, such as motors, computing equipment, lighting, etc. in the micro grid. The microgrid can include redundant power sources for a data center, a hospital, an industrial complex, an airport, etc., other than the power from the utility electrical power grid being the sole source of power. Each different microgrid can have different critical electrical loads that must maintain power even when utility power goes away.

One thing that differentiates this from a traditional micro grid is the line reactor 100 is electrically in series with the electrical power coming from the utility electrical power grid and/or the line reactor 100 cooperating with the line interactive uninterruptible power supply. The line reactor 100 prevents voltage and other power spikes/changes when the power from the utility goes away because the line reactor 100 maintains the steady state power level being supplied during the time period when the electrical controller is going through its process and steps to open up the circuit breaker between the micro grid and the power coming from the utility electrical power grid and the redundant electrical power sources in the micro grid are producing steady state voltage and amperage for the electrical loads in the micro grid.

In a normal operational mode, during normal operations, electrical power flows from the utility electrical power grid through the circuit breaker and then through the line reactor 100 to the downstream electrical loads in the micro grid. During normal operations, the steady state current is created, and the magnetic field of the inductor becomes saturated, then at that time, the line reactor 100 is almost invisible on its effects on the low frequency AC power being passed to the electrical loads. The line reactor 100 resists the instantaneous change in electrical current to delay a current or voltage change sensed by a downstream electrical load. But when the electrical power from the utility electrical power grid goes away that line reactor 100 blocks the change in power coming from the utility electrical power grid long enough for the electrical controller of the micro grid system to change a state (e.g., in this case, open) that output circuit breaker and not crash or degrade the critical voltage and amperage levels on the micro grid when power is lost on the utility electrical power grid.

The line reactor 100 blocks/resists changes to voltage and amperage changes when utility electrical power grid power goes away isolated from changes occurring in the power coming from the utility electrical power grid long enough to open up that circuit breaker and transition between power sources being responsible for supplying power into the micro grid. The other power sources for the micro grid electrically connect downstream of the line reactor. The battery driven line interactive uninterruptible power supply may couple directly into the line reactor.

The line reactor 100 cooperates with an electrical controller that is configured to change the state (e.g. open and/or close) of a set of circuit breakers in order to configure a mode of operation from the line reactor, the battery energy storage supplemental power platform, the fuel cells, and/or the solar power storage device, and the utility electrical power grid supplying electrical power to the downstream electrical loads.

During normal operations, the line reactor 100 cooperating with the battery driven line interactive uninterruptible power supply supplies the conditioned electrical power protecting the electrical load from the previously mentioned 12 issues from affecting the critical electrical loads. The battery energy storage supplemental power platform electrically connects to the line reactor 100 and cooperates with the line reactor 100 in series with the power from the utility electrical power grid to mitigate power changes due to i) instantaneous startup electrical currents, ii) other in-rush electrical currents compared to a steady state electrical current, iii) a loss of power from a utility electrical power grid, and iv) any combination of these three, until the electrical controller can change the state (e.g. open or close) of the set of circuit breakers in order to change from a first mode of operation, such as normal operations, via the line reactor, the battery energy storage supplemental power platform, and the utility electrical power grid supplying electrical power cooperating together over to a second mode of operation, such as the battery energy storage supplemental power platform being the sole redundant source of power.

The battery energy storage supplemental power platform may have a set of fast discharging lithium batteries making up a battery storage plant, a bidirectional power conversion unit, and its set of circuit breakers Q4 to supply steady state voltage and amperage for a duration of time. The battery storage plant can have fast discharging lithium batteries sized in capacity for at least an hour or more, (such as four hours), to supply enough power to keep the downstream electrical loads operational. The battery storage plant, the bidirectional power conversion unit which includes a step up voltage transformer such as 480 Volts to 35,000 Volts, and the set of circuit breakers Q4 are all contained on and electrically interconnected on the battery energy storage supplemental power platform. The fast discharging lithium batteries power up the uninterruptible power battery supply to decrease a duration/time period that a fluctuation could occur in voltage or amperage levels when a switch in the power source occurs when the power coming from the utility power grid is degraded/goes away. The fast discharging lithium batteries can have a discharge rate set at, for example, 10% capacity of batteries. Note, Lithium Ion based batteries in general discharge faster compared to other battery technologies. The output power (voltage, amperage, etc.) sensed on the micro grid is going from its steady state nominal level towards zero until the electrical controller can go through its steps to open the circuit breaker and disconnect from the utility. However, in this case, the battery driven uninterruptible power supply cooperating with the line reactor 100 makes up the loss of energy from the utility electrical power grid from its batteries. The other power sources in the micro grid can either start up or merely increase the amount of power that they are generating which takes a (small) duration of time during which the power on the micro grid being supplied to the downstream electrical loads needs to be maintained and virtual eliminate spikes during these periods of transition between power sources responsible from supplying the power into the micro grid.

In an embodiment, the uninterruptible power supply has the batteries, the electrical inverter, and the step up transformer coupled to the line reactor 100 from the side into the line reactor. In an embodiment, the uninterruptible power supply and its batteries, the electrical inverter, the step up transformer couples electrically downstream to the line reactor.

The batteries can be sized in capacity to be able to take the entire load off of the utility for the electrical loads and supply power for those peak periods, until nighttime when the micro grid system can connect back to the utility electrical power grid through the circuit breaker. If additional redundant power sources are also installed in the micro grid, then the battery capacity can be lower as the other redundant power source can be relied upon to support the electrical loads for a set period of time. For example, all of these redundant power sources can also operate when utility power is present. The redundant power sources can also operate to take power demand from the utility electrical power grid when the utility electrical power grid is experiencing these peak periods of electrical demand.

The battery storage plant of the integrated electrical power unit is configured to cooperate with the line reactor 100 to provide a continuous no break normal and emergency backup source of AC power through the inverter and transformer to supply the electrical equipment loads connected downstream to the integrated electrical power unit, and thus, the battery storage plant of the integrated electrical power unit itself acts as a substitute for the electric utility power source when the utility power source is not available, and/or during peak power periods when the utility power source is insufficient and needs the micro grid's power to supply electrical power to other loads on the utility electrical power grid.

In an embodiment, the integrated electrical power platform making up the battery energy storage supplemental power platform can include two or more sequences of a battery storage plant, an electrical inverter/power conversion unit, circuit breakers/electrical protections connected electrically in parallel with another sequence of these same electrical components. An electrical controller, such as a programmable logic controller, controls and coordinates the charging and discharging of the sequences of battery storage plants, power conversion units, and circuit breakers/electrical protections connected electrically in parallel with each other. The multiple sequences of the battery storage plant, the power conversion unit, and circuit breakers/electrical protections are contained and interconnected on a platform such as a skid framework in weather-proof containers. The battery storage plant has two or more battery energy storage modules. The battery energy storage module utilizes chemical energy stored in the batteries to provide conditioned and continuous power to electrical loads in a critical facility at any time both when utility power is not available as well as in parallel to supply a portion of the electrical load when utility power is available. The battery energy storage module can have a capacity of 3 MW-25 Megawatts. The battery energy storage supplemental power platform with the electrical inverter/power conversion unit and step up transformer can have native medium voltage operations e.g., 34.5 kV. The battery energy storage supplemental power platform has lower operating expenses-up to 80% less compared to comparable diesel generators and/or static uninterruptible power supply installations such as wind turbines. The battery energy modules (BEM) components can include Li-Ion batteries, a battery monitoring system, an environment system, and a fire detection/suppression system. The Power Conversion Systems (PCS) of the battery energy storage supplemental power platform can have components such as DC collectors, electrical inverters, a step-up transformer, a logic unit to work with the electrical controller, and an AC and DC circuit protection. The PCS during normal mode operations becomes a synchronous condenser providing VARs that compensate for the voltage losses due to the line reactor. When isolated from the utility grid, 100% of the critical load demand is provided by the PCS and BEM power. PCSs and BEMs can be paralleled together to form power blocks that can range in size from 3 MW to 25 MW.

Another power source can be a fuel cell or a solar power storage device. At least one of one or more of the fuel cells and a solar power storage device electrically connect to the line reactor 100 to provide electrical power to the downstream electrical loads and mitigate the power changes due to i) the instantaneous startup electrical currents, ii) the other in-rush electrical currents compared to the steady state electrical current, iii) the loss of power from the utility electrical power grid from effecting the downstream electrical loads, and iv) any combination of these three, until the electrical controller can change the state (e.g. open or close) of the set of circuit breakers in order to change from a first mode of operation via the line reactor, the fuel cells and/or solar power storage device, and the utility electrical power grid supplying electrical power cooperating together over to a second mode of operation such as the fuel cells and/or the solar power storage device supplying excess electrical power to the utility electrical power grid. The fuel cells and/or solar power storage device and its set of circuit breakers are constructed with electrical hardware to supply steady state voltage and amperage for a duration of time. The fuel cells and/or solar power storage device are sized in capacity for at least an hour or more, (such as four hours), to supply enough power to keep the downstream electrical loads operational and cooperate with a step up voltage transformer and the set of circuit breakers.

The line reactor 100 gives the micro grid electrical system the ability to disconnect the micro grid and have its other power sources have a duration of time in order to come up to provide a steady state nominal power level within the design threshold limits when power from the utility goes away or otherwise significantly degrades/crashes; and thus, electrical power supplied to downstream electrical loads in the micro grid does not experience power spikes/changes when the power source supplying power into the micro grid changes from the utility electrical power grid over to another power source such as the fuel cells, the solar power, the wind power, the diesel generator, etc. Overall, the line reactor 100 and uninterruptible power supply allows the downstream electrical loads in the micro grid to not experience power spikes/changes when the power source supplying power into the micro grid changes from the utility electrical power grid over to another power source.

The fuel cell makes up part of the power sources powering up the micro grid powering the critical loads.

In bypass mode, the power supplied to the critical electrical loads can be directly supported by the utility power and/or in normal mode be first conditioned by the uninterruptible power supply and then supplied to the critical load. On utility power failure, then the critical load is supported solely by the lithium batteries and/or fuel cells, as well as other power sources such as solar and wind power sources. Note, that the battery stores energy with its internal components and then releases and uses that energy, whereas the fuel cell generates energy by converting available fuel.

The solar power device can be used to provide conditioned and continuous power to electrical loads in a critical facility at any time both when utility power is not available as well as in parallel to supply a portion of the electrical load when utility power is available.

Figure 6:
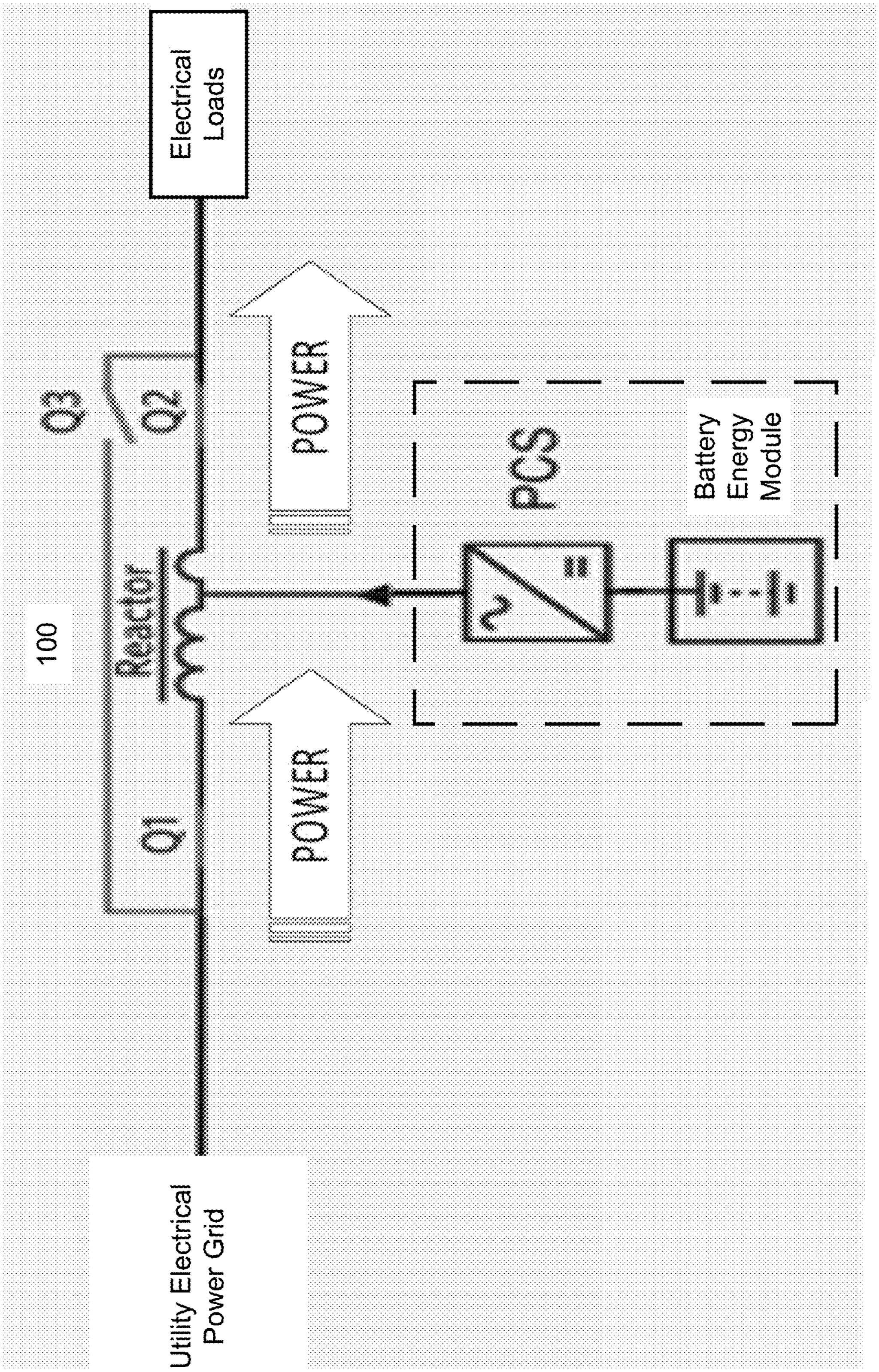
FIG. 6 illustrates an example embodiment of an electrical controller putting the set of circuit breakers and components in the micro grid into a normal power mode of operation with power supplied from the utility electrical power grid through the line reactor and further conditioned with the battery energy storage supplemental power platform to supply electrical power to the electrical loads.

FIG. 6 illustrates an example embodiment of an electrical controller putting the set of circuit breakers and components in the micro grid into a normal power mode of operation with power supplied from the utility electrical power grid through the line reactor and further conditioned with the battery energy storage supplemental power platform to supply electrical power to the electrical loads.

Figure 4:
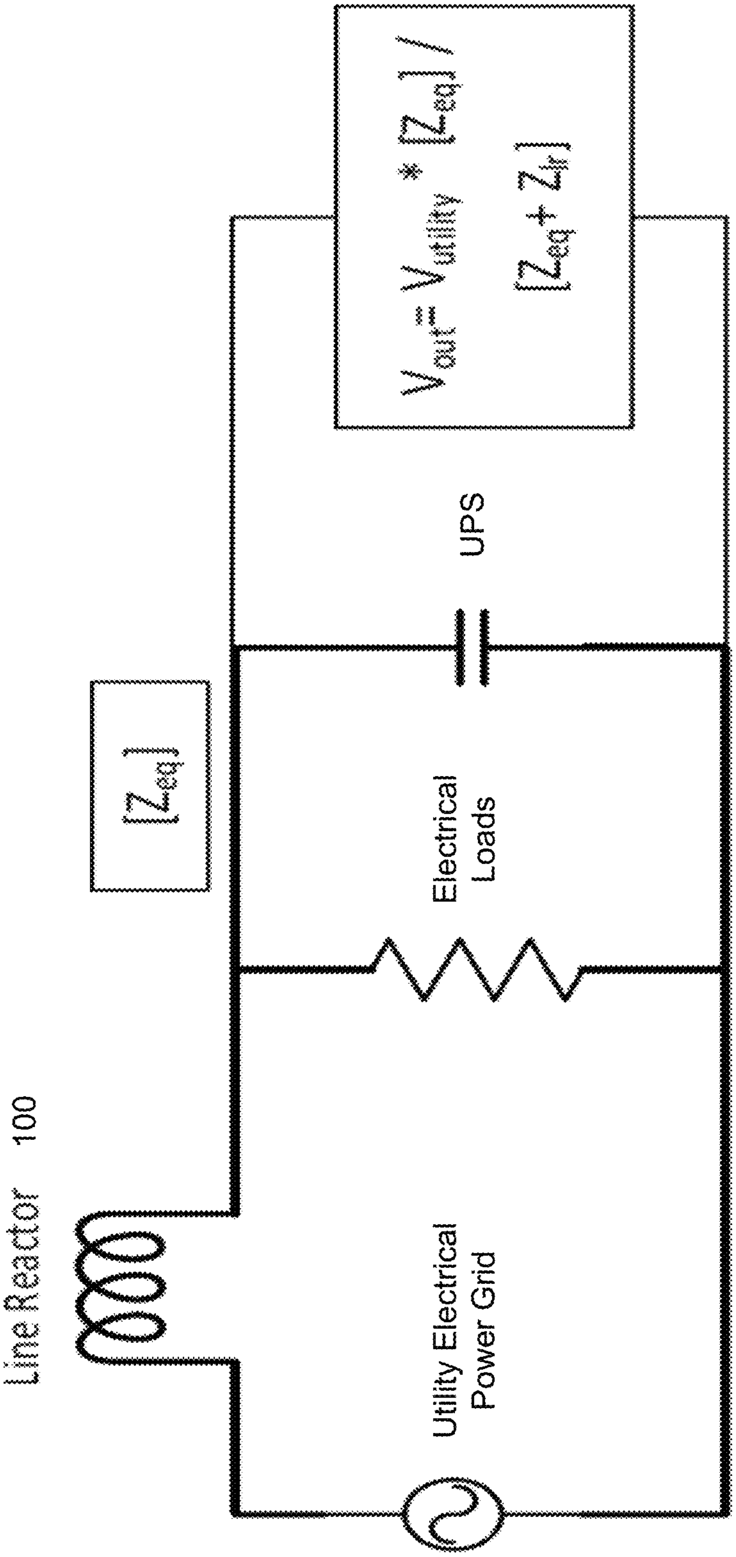
FIG. 4 illustrates an example embodiment of the line interactive UPS functioning as a UPS for the electrical power supplied to the electrical loads.

In normal power mode, electrical power to the critical load is supplied by the utility electrical power grid through the line reactor. The line reactor 100 is in series with the critical load. Electrical power demand during normal power operation supplied by the UPS output voltage is a simple voltage divider. It is a product of the impedance elements in the UPS and connected load. [Vout=Vutility*Zeq/(Zeq+Zlr)]. [Zlr+Zeq] (See FIG. 4) FIG. 4 illustrates an example embodiment of the line interactive UPS functioning as a UPS for the electrical power supplied to the electrical loads. Also, during normal power, electrical power can have power changes due to instantaneous in rush and out rush electrical currents, which the UPS and line reactor 100 can also help with. In normal power, the battery driven line interactive UPS functions as a UPS. The UPS maintains Vout by producing capacitive VARs that compensate for the voltage drop created by the series line reactor's inductive VARs. Normal power impedance calculations can be as follows.

The Vout is calculated in Equation 1 below. The equation is a simple voltage divider. It is a unique R-C-L combination in that when the impedances of the line reactor, UPS, and critical load are equal in magnitude the results of the equation always equal 1 for any impedance value. The output voltage is equal to the incoming utility voltage.

$$UPS \text{ output voltage} = Vout = Vutility * (Zsc * Zcl/Zsc + Zcl)/((Zsc * Zcl/Zsc + Zcl) + Zlr). \quad \text{Equation 1}$$

Vout equals Vin as the demand is increased until it reaches the critical impedance. The critical demand point is the point where the critical demand's impedance, the line reactor's impedance, and UPS impedances are equal in magnitude. [|Zcr]=|Zsc|=|Zlr|] That this point Vout equals Vin. See Equation 1 above.

When the load demand is lower than the critical demand point the UPS adjusts its output VARs to keep Vout at Vin. When the load demand increases beyond the critical demand point, then the voltage divider dominates. Vout is always less than Vin. Maximum UPS output power is achieved when the line reactor 100 is constructed so that its impedance equals the maximum demand impedance of the critical load.

The electrical controller is configured to change the state of the circuit breakers at least Q1 to Q7, the operational state of the redundant power sources, as well as other aspects of the components in the micro grid to configure the micro grid to operate in various modes of operation of power supply such as normal power mode, island mode, unplanned transition mode, export energy mode, etc.

In another mode of operation, the UPS, other power sources for the micro grid, and line reactor 100 can supply power when the utility grid does not have enough power on the grid and/or when a redundant power source is merely supplying a portion of the total electrical demand.

Note, that the fuel cell power is configured to support the electrical load of the micro grid and/or supply excess power capacity pushed back to the utility electrical power grid to aid the utility electrical power grid, such as during periods of peak power demand. The UPS supplies conditioned and continuous power. In an embodiment, the micro grid needs no diesel generators or low voltage UPS to supply the electrical load of the micro grid. The additional power sources for the micro grid, such as the fuel cells, can be sized at, for example, 40 to 90 megawatts to supply power on an extended basis. In a mode of operation, on a regular basis, the fuel cell will provide 60% of the electrical demand from the loads in the micro grid and the utility power from the utility power grid will provide the other 40% during normal power. Next, during peak power periods or other times when the utility is not supplying its expected share of the electrical power load then the UPS and its batteries sized in capacity can take over the responsibility for providing the electrical power for the downstream loads for greater than an hour.

In an embodiment, a mode of operation may be that the main AC power source is configured to provide a first portion of AC power, such as 40%, supplied to the electrical equipment loads that receive power in that micro grid. The other power sources such as the fuel cells, solar power, wind power, and/or UPS is configured to supply the other portion (such as 60%) of the regulated and conditioned AC power supplied to the electrical equipment loads in order to stay within the set voltage level and frequency range for the micro grid. The line reactor 100 and UPS compensate for any deficiencies from the AC power coming from the main AC power source to maintain a combined AC power supplied to the electrical equipment loads to stay within the set AC voltage level and frequency range at 100% of power demand for the electrical loads.

As discussed above, the electrical controller switches the mode of operation from the normal mode of operation with power supplied from the utility electrical power grid over to another mode of operation to split a portion of the electrical loads being supplied from the line reactor 100 and the utility electrical power grid and a remaining portion supplied from one or more redundant electrical power sources in the micro grid of power sources, including the battery energy storage supplemental power platform, the fuel cells, the solar power storage device, etc. to the downstream electrical loads. The electrical controller is configured to change the state of the set of circuit breakers and monitor a status of the redundant electrical power source supplying power to control a voltage level, a frequency, and a phase of AC electrical power from the redundant electrical power sources compared to a voltage level, a frequency, and a phase of AC electrical power from the utility electrical power grid. For example, 65% of the electrical load can be supplied from the utility electrical power grid through the line reactor 100 and 35% of the electrical load can be supplied from one or more redundant electrical power sources in the micro grid.

Modes of Operation

The typical unplanned transition event is a utility outage or a fault on the line side of the line reactor. The UPS transitions from normal power mode to an unplanned transition mode and finally to island mode of operation. During the transition, the UPS remains connected to the utility until the incoming circuit breaker can open disconnecting the UPS from the utility grid. FIG. 6 shows the PCS output during normal power operations.

Figure 7:
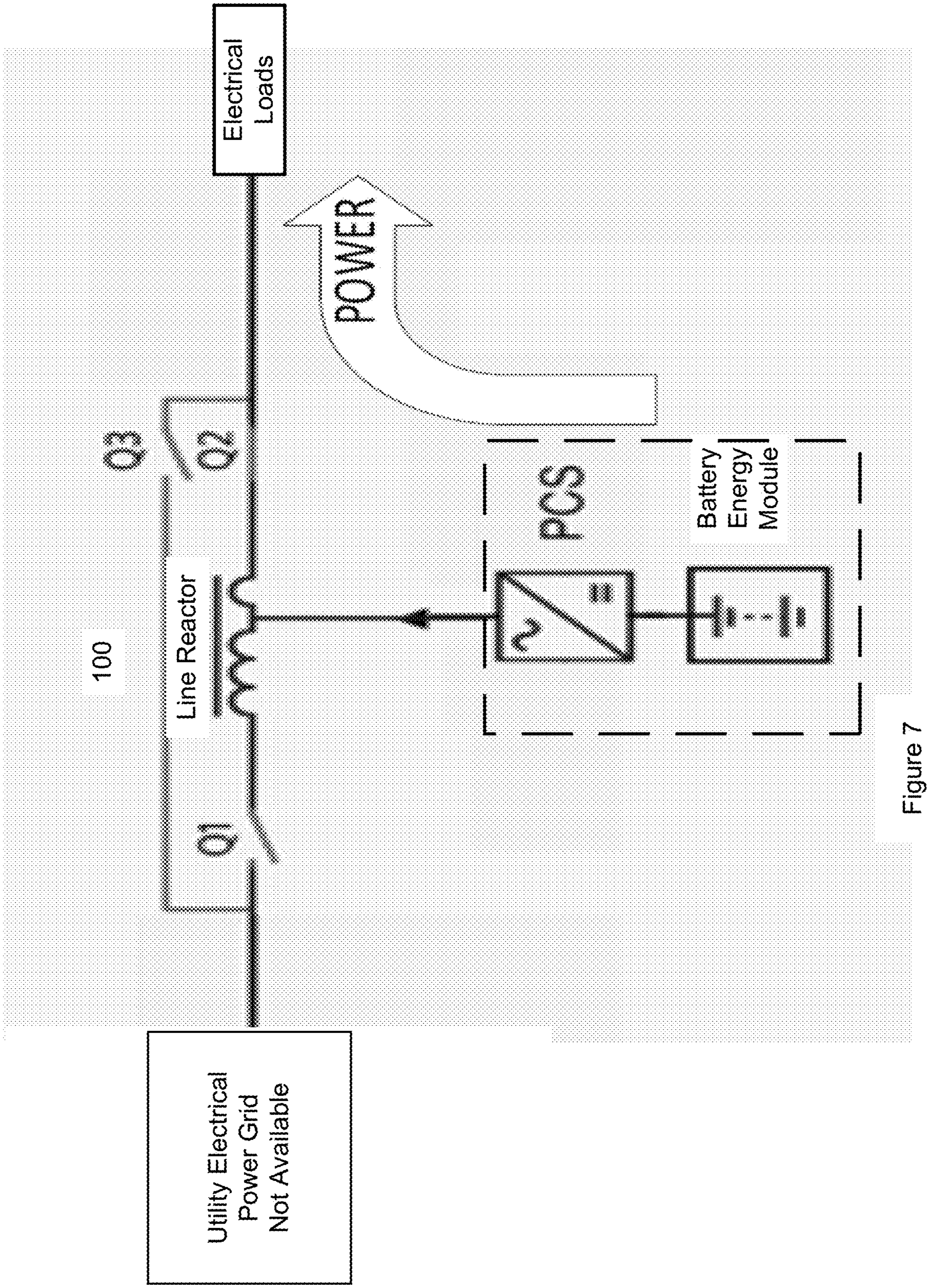
FIG. 7 illustrates an example embodiment of an electrical controller putting the set of circuit breakers and components in the micro grid into an island mode of operation with power supplied from the through the line reactor and further conditioned with the UPS battery energy storage supplemental power platform to supply electrical power to the electrical loads.

FIG. 7 illustrates an example embodiment of an electrical controller putting the set of circuit breakers and components in the micro grid into an island mode of operation with power supplied from the through the line reactor and further conditioned with the UPS battery energy storage supplemental power platform to supply electrical power to the electrical loads.

In island mode, the electrical controller is configured to change the state of each circuit breaker to isolate the AC power from the utility electrical power grid from both the battery energy storage supplemental power platform and the downstream electrical equipment loads. When switching from island mode over to normal power mode, then the electrical controller is configured to change the state of each circuit breaker to reconnect with the utility electrical power grid supplying AC power to both the battery energy storage supplemental power platform and the downstream electrical equipment loads. The electronic controller uses the circuit breakers to control power flow through the battery driven UPS including Q1 (e.g., the utility/incoming circuit breaker); Q2 the output circuit breaker; Q3 the bypass circuit breaker, and other the circuit breakers Q4-Q7 for the other redundant power sources.

Figure 8:
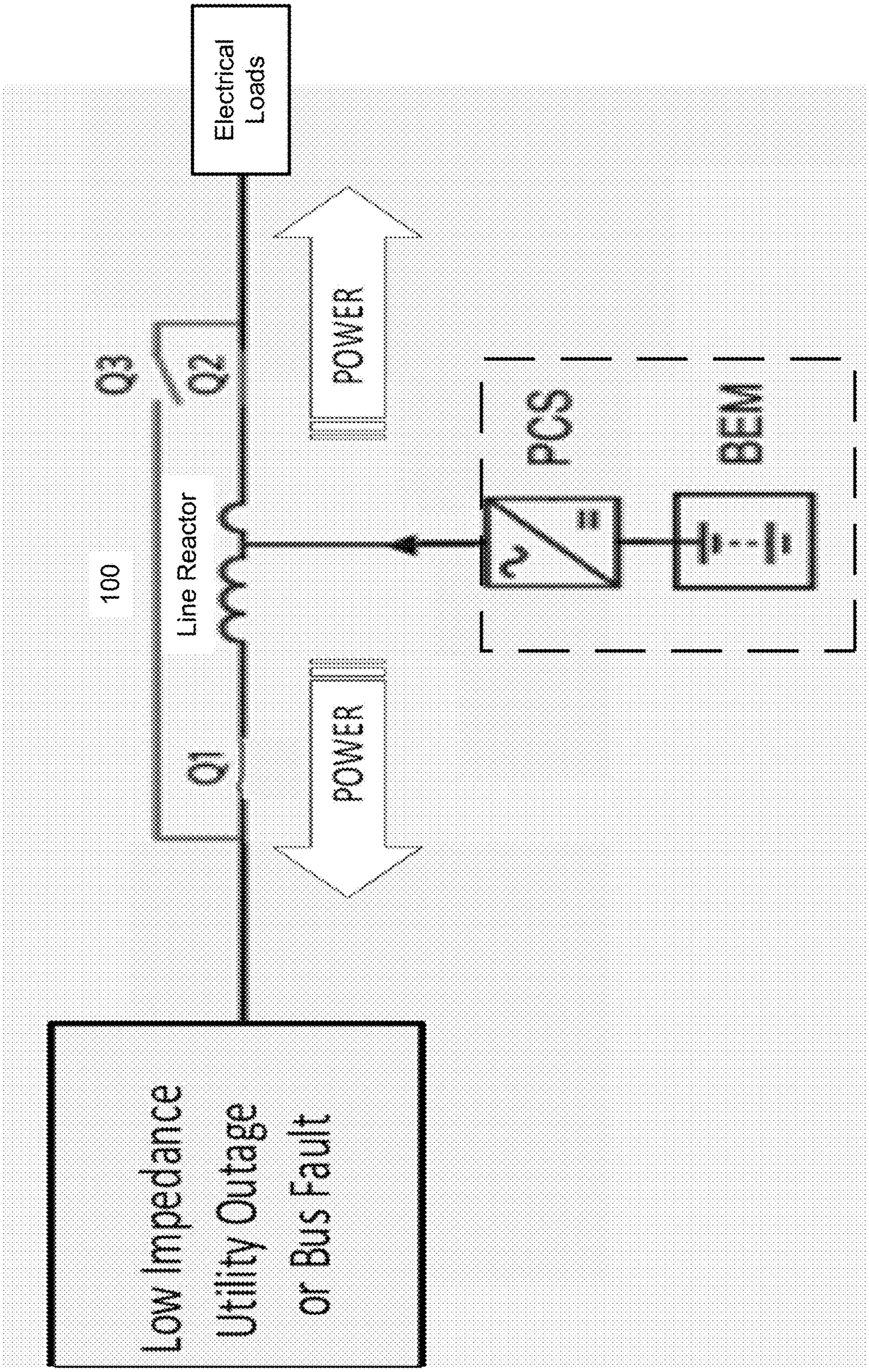
FIG. 8 illustrates an example embodiment of the electrical controller putting the set of circuit breakers and components in the micro grid into an unplanned transition mode of operation with power supplied temporarily from the through the line reactor and further conditioned with the UPS battery energy storage supplemental power platform to supply electrical power to the electrical loads as well as out to the utility electrical power grid until the electrical controller can open the circuit breaker to the utility electrical power grid.

FIG. 8 illustrates an example embodiment of the electrical controller putting the set of circuit breakers and components in the micro grid into an unplanned transition mode of operation with power supplied temporarily from the through the line reactor and further conditioned with the UPS battery energy storage supplemental power platform to supply electrical power to the electrical loads as well as out to the utility electrical power grid until the electrical controller can open the circuit breaker to the utility electrical power grid.

The electrical controller's programmed response to unplanned transitions is to put the set of circuit breakers and components in the micro grid into an unplanned transitions mode when it detects incoming utility irregularities, outages, or line fault events. During an unplanned transition, the PCS and BEM of the battery energy storage supplemental power platform instantaneously pick up 100% of the system's total electrical power demand. The micro grid's total demand is a product of the now paralleled line reactor 100 and critical load impedances. When an unplanned event occurs, then the electrical controller immediately commands the Q1 circuit breaker to open. It is during this period that the greatest demands can be placed on the PCS and BEM.

The electrical controller cooperates with sensors to monitor AC voltage level, phase, and frequency along with other characteristics of power on the utility electrical power grid. For example, 1) a normal power mode as well as 2) during a recovery operational mode when the electrical controller has previously changed the state of a circuit breaker to isolate the main AC power from the utility electrical power grid from the downstream electrical equipment loads, now the electrical controller needs to change the state of the circuit breaker Q1 to reconnect with the main AC power source.

The maximum power is required from the PCS and BEM of the battery energy storage supplemental power platform during an unplanned transition. During the transition, the line reactor 100 now becomes a load that the PCS and BEM must support. This demand can be considerably greater the that of the critical electrical load alone. This demand is determined by the parallel impedances of the line reactor 100 and the critical electrical load. It is critical for the line interactive UPS that total demand never exceeds the capacity of the UPS's backup power source. The duration to support the electrical load is dependent upon whether other redundant power sources such as kinetic or static power sources are also present in the micro grid. Maximum demands during the unplanned transition continue until the electrical controller is able to open the Q1 circuit breaker. Once the Q1 circuit breaker is opened, then the critical load is the only demand that needs to be supported by the redundant electrical power sources.

Unplanned Transition Event Calculations

The UPS is the only initial source of power during an unplanned transition event. The maximum demand occurs when the critical load's impedance is paralleled with the line reactor's impedance. Equation 2 below calculates the impedance of the maximum demand placed on the UPS during an unplanned transition event. Again, it is very important that the maximum electrical demand of the transition event does not overload the line interactive UPS. An overloaded line interactive UPS can possibly instantly shut down resulting in a loss of power to the critical load. Equation 2: Zload*Zlr Zparallel=(Zload+Zlr).

The final step for the unplanned transition occurs when the input circuit breaker Q1 opens and clears the utility or fault. The UPS completes the transition from the normal power to the island mode operation in FIG. 7. If the critical load and line reactor 100 impedances are equal in magnitude (Zcr=Zlr), then Equation 2 simply becomes Equation 3 as follows. Zeq=Z√2.

Equivalent power is calculated in Equation 4 below. The equivalent power is the minimum power required from the UPS to support the critical load. Peq=(V2/[Zeq])*√2

As noted above, the critical demand point is the point where the impedances of the load, line reactor, and UPS are equal in magnitude. Equation 5 calculates the maximum power required from the UPS during an Unplanned Transition event as follows. Pmax=Pcl*√2

Dynamic Battery UPS (DBUPS) Calculations

An example construction of a Dynamic Battery UPS (DBUPS) may be developed based on the above analysis with the following example equipment: i) a bidirectional step up kV Line voltage transformer, ii) a 4 MVA Power Conversion System (PCS), iii) 3.74 MW Battery Energy Module (BEM), and 4 MVA maximum demand. Equation 6—the maximum power required from the UPS with a 4 MVA maximum critical load demand is as follows: Pmax=Pcl*√2

The rated capacities of the PCS and the BEM must be able to support the maximum short duration demand based on the maximum rated load. Pmax=4 MVA*√2=5.66 MVA. The maximum short duration PCS power must equal to or greater than 5.66 MVA. If the PCS maximum is less than Pmax, then the PCS would shut down when overloaded resulting in a loss of power to the critical electrical load.

The impedance of the line reactor 100 is set at the equivalent impedance of the maximum demand. Therefore, with a 4 MVA demand the impedance (Z) can be as follows: Z=V2/Pdmd=124702/4,000,000=38.87 Ω

The line reactor 100 with a Z impedance that is 38.87Ω would have an L inductance of 103.7 mH, a Voltage Rating of 12.47 kV, and an Amperage Rating of 232 Amps.

To determine the line reactor's ampacity rating the following demands must be considered: maximum load demand and maximum BEM recharge demand. The line reactor 100 amps for the combined break and short break demand equal to the line interactive UPS' maximum production 3.74 MW capacity are calculated in Equation 9 as follows. Alr=4,000,000/(12470*3)=185.2 Amps.

The DBUPS line reactor 100 must have the capacity to support the maximum production demands as well as the BEM recharge demand. Limiting the BEM recharge to 25% at the maximum load demand the line reactor's amperage rating is calculated in Equation 10 as follows. Alr=185.2*1.25=231.5 Amps.

The redundant power sources provide extended capabilities to 1) split power supply to provide daily peak power shaving within the micro grid, 2) to export energy to provide utility grid support services, 3) to provide voltage stabilization, 4) to provide frequency stabilization, 5) to provide demand offset.

Export Energy Mode

The electrical controller puts the set of circuit breakers into a similar state as compared to when the micro grid is in an unplanned transition mode except the electrical controller will not transition into an island mode. Instead, the redundant electrical power sources in the micro grid need to be operated to supply power to the electrical loads as well as export energy from the micro grid into the utility electrical power grid. The electrical controller switches the mode of operation from a normal power flow supply from the utility electrical power grid over to another mode of operation to export energy from a micro grid of power sources. The electrical controller is configured to change the state of the set of circuit breakers and monitor a status of redundant electrical power source supplying power to control a voltage level, a frequency, and a phase of AC electrical power from the redundant electrical power sources compared to a voltage level, a frequency, and a phase of AC electrical power on the utility electrical power grid to export energy from the micro grid of power sources into the utility electrical power grid.

The utility power grid is becoming 'peaked out' on capacity as demand for more electrical loads increases but generation power sources nominally supplying power into that grid are not being built at the same rate. The utilities may not have any additional power generation capacity for the utility grid for 5 to 6 more years. During 'peak on' periods during the worst electrical demand days, for example, those hours in the afternoon during hot days in the summer when everybody is building and the home has all of the fans and air conditioning on, then the utility grid will start rolling brown outs/black outs that turn off power in selected areas of the electrical power grid during hours at a time. The redundant power sources for the micro grid need to be able to supply power for the downstream electrical loads in the micro grid to cover those peak periods for the utility and/or cover the periods when the utility electrical power grid power goes down due to some electrical fault. The redundant power sources can be configured to supply 100% of the electrical load for X amount of hours as well as be configured to supply 100% of the electrical load for X amount of hours while supplying 20% of the electrical load as exported energy into the utility electrical power grid.

Other Modes

An energy storage mode of operation can be the normal power flow supply from the utility electrical power grid switched over to the energy storage mode of operation to store energy into the battery energy storage supplemental power platform. The electrical controller is configured to change the state of the set of circuit breakers to direct AC power from the utility electrical power grid into the battery energy storage supplemental power platform to charge the batteries during off hour operations when the electrical demands are traditionally low.

The electrical controller can also be configured to change the state of the circuit breakers to transfer the microgrid into bypass mode from line reactive UPS power over to raw utility power bypassing the line reactive UPS and the line reactor. Once the transition has been manually initiated the electrical controller synchronizes the UPS output power to match the utility electrical power grid, and then closes the Q3 circuit breaker before opening the Q2 circuit breaker. The sequence is reversed when transferring from bypass mode to normal power mode.

The electrical controller can also be configured to change the state of the circuit breakers to transfer the microgrid into just the redundant electrical power sources supplying the electrical loads. The electrical controller configures the components from a normal power flow of operation over to a redundant electrical power source, such as a backup generator, coming online. The electrical controller switches the mode of operation to the redundant electrical power source, such as a backup electrical generator, coming online by changing the state of the set of circuit breakers to isolate the redundant power source from the AC power from the utility electrical power grid and the electrical loads until they reach a steady state power supply output.

Computing Devices

Figure 9:
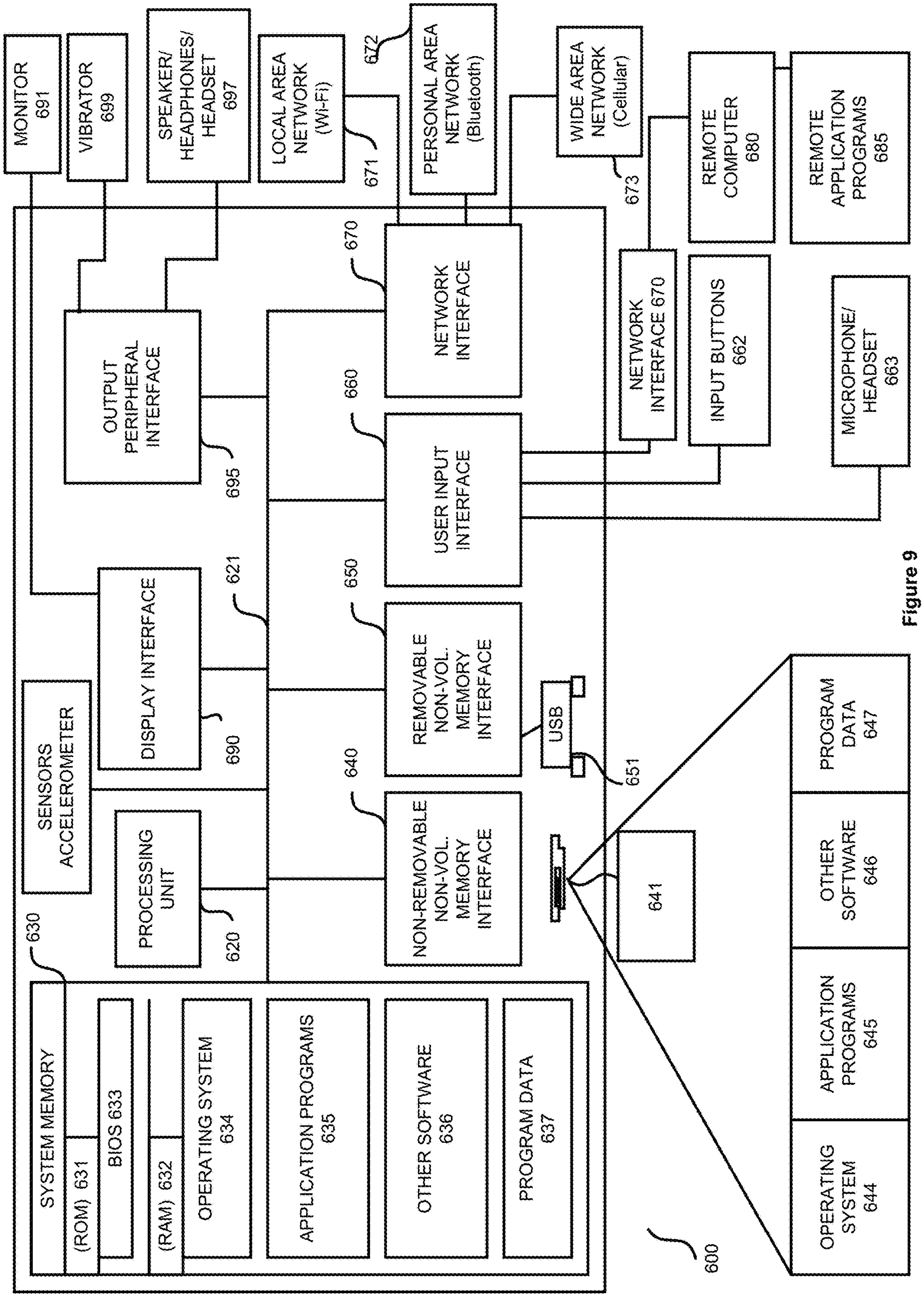
FIG. 9 illustrates a block diagram of an embodiment of one or more computing devices that can be a part of the electronic controller and other parts of the micro grid discussed herein.

FIG. 9 illustrates a block diagram of an embodiment of one or more computing devices that can be a part of the electronic controller and other parts of the micro grid discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software. In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball, or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. A controller is a core component of a complex system consisting of hardware and software that is capable of performing its function discretely from other portions of the entire complex system but designed to interact with the other portions of the entire complex system.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown, the invention is not to be limited to these embodiments. For example, most functions performed by electronic hardware components may be duplicated by software emulation. Thus, a software program written to accomplish those same functions may emulate the functionality of the hardware components in input-output circuitry. The type of cabinets may vary, etc. The invention is to be understood as not limited by the specific embodiments described herein, but only by scope of the appended claims.

The invention claimed is:

1. An apparatus, comprising:

a line reactor that has a first electrical connection configured to electrically connect in series with an electrical power supplied from a utility electrical power grid, where the line reactor electrically in series with the electrical power from the utility electrical power grid is configured to mitigate power changes due to a prescribed condition, where the line reactor in series with the electrical power from the utility electrical power grid that has a second electrical connection configured to cooperate with a micro grid of redundant electrical power sources so that the utility electrical power grid is not a sole source of electrical power to electrical loads connected downstream of the line reactor, where the line reactor is configured to cooperate with an electrical controller configured to change a state of a set of circuit breakers to configure a mode of operation from the line reactor, the redundant electrical power sources in the micro grid, and the utility electrical power grid supplying electrical power to downstream electrical loads, and wherein the line reactor is an inductor, where the inductor has a physical size, including a diameter thickness of wire gauge, and a composition of materials of the inductor to store at least enough energy to match an energy consumption requirements of the electrical loads for a time period in duration to sustain a switching from a first mode of operation to a second mode of operation, where the first mode of operation includes i) a first portion of the electrical loads being supplied from the line reactor and the utility electrical power grid and ii) a remaining portion of the electrical loads being supplied power from the redundant electrical power sources in the micro grid to the downstream electrical loads, wherein the electrical controller is configured to change the state of the set of circuit breakers and monitor a status of the utility electrical power grid and the redundant electrical power sources in the micro grid.

2. The apparatus of claim 1, where the line reactor is an iron core inductor that is sized large enough in electrical current rating to store at least enough energy to match an entire energy consumption requirement of the downstream electrical loads for the time period in duration to sustain the switching from the first mode of operation to the second mode of operation without dropping below a threshold amount from a steady state voltage and amperage supplied in the first mode of power supply.

3. The apparatus of claim 1, where the line reactor is configured to couple to a line interactive uninterruptible power supply to supply conditioned continuous electrical power to the downstream electrical loads as well as, depending on the mode of operation, electrical power back to the utility electrical power grid.

4. The apparatus of claim 1, wherein the mitigate power changes due to the prescribed condition corresponding to i) instantaneous startup electrical currents, ii) other in-rush electrical currents compared to a steady state electrical current, iii) a loss of power from the utility electrical power grid, and iv) any combination of these three.

5. A method to provide a line reactor for electrical power supply, comprising:

providing a line reactor that has a first electrical connection to electrically connect in series with an electrical power supplied from a utility electrical power grid;

providing the line reactor electrically in series with the electrical power from the utility electrical power grid to mitigate power changes due to a prescribed condition;

providing the line reactor in series with the electrical power from the utility electrical power grid that has a second electrical connection to cooperate with a micro grid of redundant electrical power sources so that the utility electrical power grid is not a sole source of electrical power to electrical loads connected downstream of the line reactor;

providing the line reactor to cooperate with an electrical controller configured to change a state of a set of circuit breakers to configure a mode of operation from the line reactor, the redundant electrical power sources in the micro grid, and the utility electrical power grid supplying electrical power to downstream electrical loads; and providing the line reactor as an inductor, where the inductor has a physical size, including a diameter thickness of wire gauge, and a composition of materials of the inductor to store at least enough energy to match an energy consumption requirements of the electrical loads for a time period in duration to sustain a switching from a first mode of operation to a second mode of operation, where the first mode of operation includes i) a first portion of electrical demand for the electrical loads being supplied from the line reactor and the utility electrical power grid and ii) a remaining portion of the electrical demand of the electrical loads being supplied power from the redundant electrical power sources in the micro grid to the downstream electrical loads, where the electrical controller is configured to change the state of the set of circuit breakers and monitor a status of the utility electrical power grid and the redundant electrical power sources in the micro grid.

6. The method of claim 5, further comprising:

providing the line reactor as an iron core inductor that is sized large enough in electrical current rating to store at least enough energy to match an entire energy consumption requirement of the downstream electrical loads for the time period in duration to sustain the switching from the first mode of operation to the second mode of operation without dropping below a threshold amount from a steady state voltage and amperage supplied in the first mode of power supply.

7. A system, comprising:

a line reactor electrically connected in series with a power supplied from a utility electrical power grid, a battery energy storage supplemental power platform electrically connected to the line reactor and configured to cooperate with the line reactor in series with the power from the utility electrical power grid to mitigate power changes due to a prescribed condition, where the line reactor is configured to cooperate with an electrical controller configured to change a state of a set of circuit breakers to configure a mode of operation from the line reactor, the battery energy storage supplemental power platform, and the utility electrical power grid supplying electrical power to downstream electrical loads, where the battery energy storage supplemental power platform and the line reactor in series with the power from the utility electrical power grid cooperate to provide electrical power to the downstream electrical loads and mitigate the power changes due to the prescribed condition, until the electrical controller can change the state of the set of circuit breakers in order to change from a first mode of operation via the line reactor, the battery energy storage supplemental power platform, and the utility electrical power grid supplying electrical power cooperating together over to a second mode of operation, and where the line reactor is constructed to temporarily maintain steady state voltage and amperage; and thus, resist changes to the steady state voltage and amperage in supplied electrical power to electrical loads connected downstream of the line reactor when the prescribed condition occurs from affecting the downstream electrical loads long enough in time in order to safely change the state of the set of circuit breakers to transition between power sources being responsible for supplying the electrical power to the downstream electrical loads when changing from the first mode of operation to the second mode of operation, where the first mode of operation is a normal power flow supply from the utility electrical power grid switched by the electrical controller over to the second mode of operation to split a portion of the electrical loads being supplied from the line reactor and the utility electrical power grid and another portion supplied from one or more redundant electrical power sources in a micro grid of power sources, including the battery energy storage supplemental power platform, to the downstream electrical loads, where the electrical controller is configured to change the state of the set of circuit breakers and monitor a status of redundant electrical power source supplying power to control a voltage level, a frequency, and a phase of alternating current (AC) electrical power from the redundant electrical power sources compared to a voltage level, a frequency, and a phase of AC electrical power from the utility electrical power grid.

8. The system of claim 7, where the battery energy storage supplemental power platform, the line reactor, the electrical controller, and the set of circuit breakers are part of a micro grid of redundant electrical power sources so that the utility electrical power grid is not a sole source of power to the electrical loads connected downstream of the line reactor, where the utility electrical power grid connects to a top portion of the line reactor and the battery energy storage supplemental power platform and other redundant electrical power sources in the micro grid as well as the electrical loads connect downstream to a bottom portion of the line reactor, where the other redundant electrical power sources in the micro grid include one or more of fuel cells, a solar power storage device, a wind power generator, and a diesel generator.

9. The system of claim 7, where the battery energy storage supplemental power platform has a set of fast discharging lithium batteries making up a battery storage plant, a bidirectional power conversion unit, and its set of circuit breakers to supply steady state voltage and amperage for a duration of time, where the battery storage plant has fast discharging lithium batteries sized in capacity for at least an hour or more to supply enough power to keep the downstream electrical loads operational, the bidirectional power conversion unit including a step up voltage transformer, and the set of circuit breakers are contained on and electrically interconnected on the battery energy storage supplemental power platform.

10. The system of claim 7, where the first mode of operation is a normal power flow supply from the utility electrical power grid switched over by the electrical controller to the second mode of operation to export energy from a micro grid of power sources, where the electrical controller is configured to change the state of the set of circuit breakers and monitor a status of a redundant electrical power source supplying power to control a voltage level, a frequency, and a phase of AC electrical power from the redundant electrical power source compared to a voltage level, a frequency, and a phase of AC electrical power on the utility electrical power grid to export energy from the micro grid of power sources into the utility electrical power grid.

11. The system of claim 7, where the line reactor is an iron core inductor and is sized large enough in electrical current rating to store at least enough energy to match an entire energy consumption requirement of the electrical loads for a time period in duration to sustain a switching from the first mode of operation to the second mode of operation without dropping below a threshold amount from the steady state voltage and amperage.

12. The system of claim 7, where the line reactor is an inductor, where the inductor has a physical size including a diameter thickness of wire gauge and a composition of materials of the inductor to store at least enough energy to match an energy consumption requirements of the electrical loads for a time period in duration to sustain a switching from the first mode of operation to the second mode of operation.

13. The system of claim 7, where the line reactor couples to a line interactive uninterruptible power supply to supply conditioned continuous electrical power to the downstream electrical loads as well as depending on the mode of operation electrical power back to the utility electrical power grid.

14. The method of claim 5, wherein the mitigate power changes due to the prescribed condition corresponding to i)

instantaneous startup electrical currents, ii) other in-rush electrical currents compared to a steady state electrical current, iii) a loss of power from the utility electrical power grid, and iv) any combination of these three.

15. The system of claim 7, wherein the battery energy storage supplemental power platform is configured to cooperate with the line reactor to mitigate the power changes due to the prescribed condition corresponding to i) instantaneous startup electrical currents, ii) other in-rush electrical currents compared to a steady state electrical current, iii) a loss of power from the utility electrical power grid, and iv) any combination of these three.

* * * * *